J. J. BYERS.
DRAFT RIGGING.
APPLICATION FILED MAY 23, 1910.
1,011,116.
Patented Dec. 5, 1911.
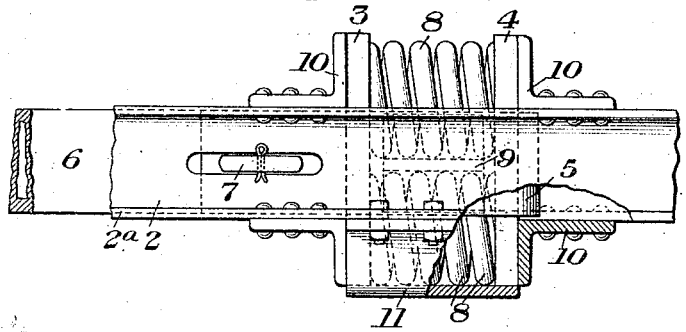
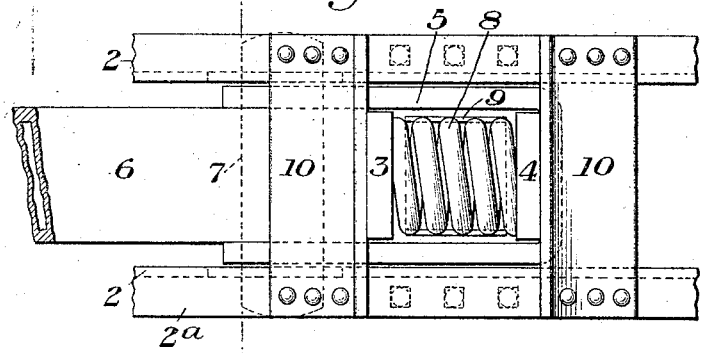
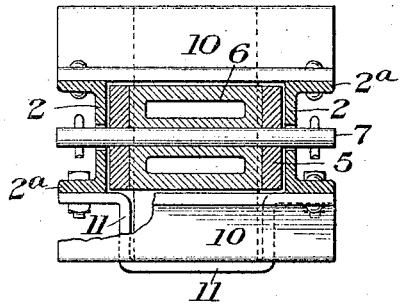
WITNESSES
R A Balderson
Walter Tamarish
INVENTOR
J. J. Byers
by Bakewell, Byrnes & Parmelee
his Attys.

UNITED STATES PATENT OFFICE.

JACOB J. BYERS, OF CHICAGO, ILLINOIS, ASSIGNOR TO THE NATIONAL MALLEABLE CASTINGS COMPANY, OF CLEVELAND, OHIO, A CORPORATION OF OHIO.

DRAFT-RIGGING.

1,011,116.  Specification of Letters Patent.  Patented Dec. 5, 1911.

Application filed May 23, 1910. Serial No. 562,795.

*To all whom it may concern:*

Be it known that I, JACOB J. BYERS, a resident of Chicago, Cook county, State of Illinois, have invented a new and useful Improvement in Draft-Riggings, of which the following is a full, clear, and exact description, reference being had to the accompanying drawings, forming part of this specification, in which—

Figure 1 is a side view partly in section of a draft rigging embodying my invention; Fig. 2 is a plan view of the same; and Fig. 3 is a section on the line III—III of Fig. 2, partly broken away.

My invention has relation to draft riggings, and more particularly to draft riggings of the type described and claimed in my Patent, No. 673,419, of May 7, 1901, in which the draft springs are arranged one above the other and are removable from below, the yoke embracing the springs laterally instead of vertically.

My present invention is designed to provide means of simple and efficient character for connecting the draft rigging to the draft sills and for providing a pocket to contain the draft rigging.

Referring to the accompanying drawings, the numeral 2 designates the draft sills, which are shown as consisting of spaced channels having their flanges 2ª turned outwardly.

3 is the front follower, 4 the rear follower, and 5 the yoke which embraces the followers laterally, and which is secured to the drawbar 6 by any usual or suitable means, such as the key 7.

8 designates the springs, which are arranged between the followers, one above the other, with an interposed separator 9.

In accordance with my invention, I rivet or otherwise rigidly secure to the draft sills 2 four angle members 10, two of these members extending across the top of the draft sills and two of them across the bottom of said sills, and being riveted to the outwardly turned flanges thereof. The two pairs of angles are separated from each other sufficiently to form between them the pocket for the followers and springs, the inner faces of the vertical portions of the angles forming bearings or abutments for the followers above and below the draft sills.

For the purpose of normally preventing the followers and springs from dropping down between the draft sills and bottom angles, I provide the strap or yoke 11, which is detachably secured to the draft sills and has an offset central portion which normally supports the lower ends of the followers. This strap or yoke can be readily removed, when desired, to permit the followers and springs to be removed downwardly between the sills and lower angles.

The construction provides a very simple and cheap means for attaching the draft rigging to the draft sills and for providing a suitable pocket for the draft springs and followers.

I claim:

1. In a draft rigging, the combination with draft sills, of angles secured to the upper and lower edges of said sills connecting the same transversely, said angles being spaced from each other and forming abutments, substantially as described.

2. In a draft rigging, the combination with draft sills, of members secured to the upper and lower edges of said sills and connecting the same transversely, said members being spaced from each other longitudinally on the sills and having vertical portions whose inner faces form abutments for the draft rigging followers together with draft rigging followers arranged to bear against said abutments, substantially as described.

In testimony whereof, I have hereunto set my hand.

JACOB J. BYERS.

Witnesses:
B. S. CONLIN,
D. S. COOLEY.